United States Patent
Black (10) Patent No.: US 12,012,997 B2
(45) Date of Patent: Jun. 18, 2024

(54) CONE CLUTCH SYSTEM

(71) Applicant: Rolls-Royce Corporation, Indianapolis, IN (US)

(72) Inventor: Joseph D. Black, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/930,192

(22) Filed: Sep. 7, 2022

(65) Prior Publication Data

US 2023/0074560 A1 Mar. 9, 2023

Related U.S. Application Data

(60) Provisional application No. 63/241,371, filed on Sep. 7, 2021.

(51) Int. Cl.
| | | |
|---|---|---|
| *F16D 13/66* | (2006.01) | |
| *F16D 13/30* | (2006.01) | |
| *F16D 13/72* | (2006.01) | |

(52) U.S. Cl.
CPC ............. *F16D 13/30* (2013.01); *F16D 13/66* (2013.01); *F16D 13/72* (2013.01)

(58) Field of Classification Search
CPC ........ F16D 1/05; F16D 1/09–097; F16D 7/08; F16D 13/24–36; F16D 13/66;
(Continued)

(56) References Cited

U.S. PATENT DOCUMENTS

| | | | | |
|---|---|---|---|---|
| 2,559,747 | A | * | 7/1951 | Batchelor ............... F16D 13/66 |
| | | | | 264/DIG. 73 |
| 2,865,481 | A | | 12/1958 | Giri De Termala |

(Continued)

FOREIGN PATENT DOCUMENTS

| | | | |
|---|---|---|---|
| EP | 1342932 B1 | 4/2008 | |
| EP | 3273085 A1 | 1/2018 | |
| KR | 2019068116 A | * 6/2019 | ............. F16D 13/26 |

OTHER PUBLICATIONS

Lighter Rotors More Muscle, retrieved from https://www.ceramicdisctech.com on Jul. 21, 2021, 2 pp.
(Continued)

*Primary Examiner* — Tinh Dang
(74) *Attorney, Agent, or Firm* — Shumaker & Sieffert, P.A.

(57) ABSTRACT

In some examples, a cone clutch assembly includes an inner cone member rotationally coupled to a first shaft, the inner cone member defining a first friction surface, and an outer cone member rotationally coupled to a second shaft, the outer cone member defining a second friction surface opposing the first friction surface. The inner cone member and outer cone member are configured to be selectively engage and disengaged from each other. When the inner cone member is engaged with the outer cone member, the first friction surface of the inner cone member frictionally engages the second friction surface of the outer cone member such that rotational motion is transferred between the inner cone member and the outer cone member. The inner surface of the inner cone member opposing the first friction surface includes at least one groove configured to receive a cooling fluid during operation of the cone clutch assembly.

20 Claims, 8 Drawing Sheets

(58) Field of Classification Search
CPC ......... F16D 2023/0681; F16D 25/0632; F16D 27/11; F16D 43/08–12; F16D 43/218
See application file for complete search history.

(56) References Cited

U.S. PATENT DOCUMENTS

| | | | |
|---|---|---|---|
| 3,300,004 | A | 1/1967 | Peterson |
| 3,823,802 | A | 7/1974 | Winzeller et al. |
| 4,030,583 | A | 6/1977 | Miller |
| 4,262,789 | A | 4/1981 | Collins |
| 4,593,801 | A | 6/1986 | Tekeuchi et al. |
| 6,834,751 | B1 | 12/2004 | Magee |
| 7,308,977 | B2 | 12/2007 | Maguire et al. |
| 7,799,250 | B2 | 9/2010 | Huener et al. |
| 8,051,968 | B2 | 11/2011 | Arnold et al. |
| 8,100,239 | B2 | 1/2012 | Swanson et al. |
| 8,893,868 | B2 | 11/2014 | Kennedy |
| 9,921,037 | B2 | 3/2018 | Wadley et al. |
| 10,830,286 | B2 | 11/2020 | Zhang et al. |
| 11,781,603 | B2 | 10/2023 | Black |
| 2003/0006074 | A1* | 1/2003 | Ishikawa ............... F16D 43/284 180/19.1 |
| 2004/0159524 | A1 | 8/2004 | Carpenter et al. |
| 2005/0059529 | A1* | 3/2005 | Sakamoto ............. B60W 10/06 477/174 |
| 2006/0049017 | A1 | 3/2006 | Furuichi |
| 2006/0180423 | A1 | 8/2006 | Kos et al. |
| 2007/0023253 | A1 | 2/2007 | Wayman |
| 2009/0114498 | A1 | 5/2009 | Arnold et al. |
| 2011/0259699 | A1 | 10/2011 | Swanson |
| 2015/0211586 | A1 | 7/2015 | Hutchinson |
| 2015/0267765 | A1 | 9/2015 | Kim et al. |
| 2016/0084321 | A1 | 3/2016 | Mihajlovic et al. |
| 2016/0178016 | A1 | 6/2016 | Swift et al. |
| 2018/0112720 | A1 | 4/2018 | Choi et al. |
| 2018/0266493 | A1 | 9/2018 | Dempfle et al. |
| 2019/0120309 | A1 | 4/2019 | Sung et al. |
| 2021/0054883 | A1 | 2/2021 | Grethel et al. |
| 2021/0207671 | A1 | 7/2021 | Siegel et al. |

OTHER PUBLICATIONS

U.S. Appl. No. 17/446,893, filed Sep. 3, 2021, by Bartolomeo et al.
U.S. Appl. No. 17/564,288, filed Dec. 29, 2021, by Black et al.
Zelinski, "Lighter, Better-Performing Brake Rotor From 3D Printing: The Cool Parts Show #27," Additive Manufacturing, Mar. 31, 2021, 6 pp.
Prosecution History from U.S. Appl. No. 17/930,239, dated Jan. 30, 2023 through Jun. 14, 2023, 36 pp.

* cited by examiner

CONE CLUTCH SYSTEM

This application claims the benefit of U.S. Provisional Patent Application No. 63/241,371, filed Sep. 7, 2021, the entire content of which is incorporated herein by reference.

TECHNICAL FIELD

The disclosure relates to cone clutch assemblies and systems that include the same.

BACKGROUND

Gas turbine engines include various accessory components to enable the engine to operate, such as, for example, fuel pumps, oil pumps, electric generators and/or motors. Often, accessory components are driven by a turbine through an accessory gearbox. In some implementations, accessory components are rotationally coupled to the accessory gearbox using a mechanical clutch, which allows selective disconnection of the accessory components from the gearbox and turbine when the accessory components are not needed.

SUMMARY

The disclosure describes cone clutch assemblies, systems including such assemblies, and techniques for making and using the same. An example cone clutch assembly may include an inner (male) cone member and outer (female) cone member each defining opposing friction surfaces that frictionally engage with each other when the cone clutch assembly is in an engaged configuration, e.g., to transfer rotational motion to an output shaft from an input shaft with the cone clutch assembly. The back side surface (also referred to as the inner surface) of the inner cone member may include one or more grooves that facilitate the removal of heat from the inner cone member. For example, a cooling fluid may be delivered to the back side/inner surface of the inner cone member, e.g., with an oil jet during operation of the cone clutch assembly, and heat from the cone member may be conducted into the cooling fluid across the inner surface. The oil may gather within the one or more grooves and be transferred out of the grooves to remove heat from the inner cone member.

In some examples, the groove(s) may extend circumferentially on the back side/inner surface of the inner cone member about the rotational axis, e.g., in a helical or spiral manner. This may allow the cooling fluid to be routed through the groove(s) centrifugally without flooding the groove(s) and stagnating the cooling fluid. In some examples, the groove(s) may include one more through holes extending from the inner surface of the inner cone member to transfer the cooling fluid between the inner surface to the friction surface of the inner cone member (e.g., to provide lubricity to the friction surface to control the coefficient of friction). The circumferential orientation of the grooves may provide for increased hoop stiffness of the cone member, e.g., to prevent or reduce deflection of the cone member under centrifugal loading.

In some examples, the groove(s) may function or otherwise form cooling fins, e.g., that provide cooling of the cone member during operation of the clutch assembly. The groove(s) may provide a relatively high amount of surface area to transfer heat as needed during operation. Locating the groove(s) circumferentially may also provide more groove length (e.g., as compared to axially orientated grooves) and therefore more surface area to absorb and transfer more heat.

In some examples, the disclosure describes a cone clutch assembly comprising: an inner cone member configured to be rotationally coupled to a first shaft, the inner cone member defining a first friction surface; an outer cone member configured to be rotationally coupled to a second shaft, the outer cone member defining a second friction surface opposing the first friction surface; and wherein the inner cone member and outer cone member are configured to be selectively engage and disengaged from each other, wherein, when the inner cone member is engaged with the outer cone member, the first friction surface of the inner cone member frictionally engages the second friction surface of the outer cone member such that rotational motion is transferred between the inner cone member and the outer cone member, and wherein an inner surface of the inner cone member opposing the first friction surface includes at least one groove configured to receive a cooling fluid during operation of the cone clutch assembly.

In some examples, the disclosure describes a method of operating a cone clutch assembly, the method comprising engaging an inner cone member with the outer cone member, wherein the inner cone member is rotationally coupled to a first shaft and defines a first friction surface, wherein the outer cone member is rotationally coupled to a second shaft and defines a second friction surface opposing the first friction surface, wherein, when the inner cone member is engaged with the outer cone member, the first friction surface of the inner cone member frictionally engages the second friction surface of the outer cone member such that rotational motion is transferred between the inner cone member and the outer cone member, and wherein an inner surface of the inner cone member opposing the first friction surface includes at least one groove configured to receive a cooling fluid during operation of the cone clutch assembly.

The details of one or more examples are set forth in the accompanying drawings and the description below. Other features, objects, and advantages will be apparent from the description and drawings, and from the claims.

DETAILED DESCRIPTION

The disclosure generally describes systems including a cone clutch assembly, and techniques for using the same.

The cone clutch assembly may include an inner cone member (or "male cone") that is configured to selectively engage an outer cone member (or "female cone"), e.g., with one or more layers of a friction material between the opposing surfaces of the inner and outer cone members. The inner surface of inner cone member may include one or more grooves formed into the surface that are configured to receive a fluid that acts as a cooling fluid, e.g., during operation of the clutch assembly. The fluid may be delivered to the inner surface of the inner cone member by a jetting member or other fluid delivery device. In some examples, the grooves are spiraled about the rotational axis of the clutch assembly to form circumferential grooves. The grooves may have straight and/or tapered edges, and may include one or more vias or through holes running from the grooves to the opposing (friction) surface of the inner cone member (e.g., to supply oil and cooling to the friction surface).

In some examples, cone clutch assemblies may be used to control engagement of system accessories, such as aircraft accessories of gas turbine engine systems. For example, a cone clutch may be used to selectively drive system accessories of an aircraft using a gas turbine engine that provides the primary propulsion for the aircraft. In some examples, the clutch assembly may be employed to selectively engage and disengage a reduction gearbox which drives a propeller for forward thrust of an aircraft such as a helicopter. The cultch may be driven by an engine via the helicopter reduction gearbox.

A cone clutch assembly may have an input and an output shaft selectively coupled or decoupled (also referred to as engaged and disengaged) by two mating cone members. The input shaft may be continually driven by prime mover such as an engine or motor. The output shaft of the clutch can be engaged or disengaged from the prime mover allowing it to drive or disconnect driven assemblies such as gearboxes, fans, generators, etc. The cone members may be selectively engaged or coupled together by application of an axial force to clamp the inner (male) and outer (female) cone members together via friction. Typically, one cone member may be constructed from steel and the other member incorporates a friction liner to uniformly control friction and provide wear resistance. The liner may be used to control friction and improve wear resistance, and may be fabricated from materials such as bronze, carbon/carbon, Kevlar fiber encapsulated by a binder material or other friction tolerant materials to provide the clutch function. The steel cone member may be case or core hardened for durability.

Cone clutches may offer a number of significant advantages over other styles of clutches in terms of compact packaging and low weight. Power density and circumferential velocities at the rubbing surfaces control the package size of the arrangement. These limitations are driven by wear and temperatures at the rubbing surfaces of the clutch.

However, the friction surfaces between the two mating cone members can be difficult to cool for high speed/high tip velocity applications. Oil (or other fluid) supply normally provides the cooling medium for the cone members. However, the friction interface between the cone members can be very difficult to oil cool. For friction liners without oil cooling slots, active cooling may only take place before and after the clutch engagement. During the engagement, the oil flow may be restricted at the friction interface. Cooling channels may be added to the friction liner mounted on the outer cone member (female) to provide a path for oil cooling. However, the inner cone member (male) may still be difficult to cool with this arrangement since cooling oil is driven out to the outer/female cone member via windage and/or centrifugal forces. The inner cone (male) member may receive very little oil at the friction surface. Oil cooling may also be targeted at the inner diameter of the inner/male cone member; however, cooling effectiveness may be limited by the thick radial section used for the cone section. This thick section may be required to maintain a high stiffness for the inner/male cone member and thus prevents distortion of the cone angle to avoid cone angle mismatches with the mating member. Mismatched cone angles lead to high heat loading and wear due to reduced contact area.

In accordance with examples of the disclosure, a cone clutch assembly may include an inner cone member having an inner surface including one or more grooves formed into the surface, where the groove(s) are configured to receive a fluid that acts as a cooling fluid, e.g., during operation of the clutch assembly. The fluid may be delivered to the back side (inner surface) of the inner cone member by a jetting member or other fluid delivery device. In some examples, the grooves are spiraled about the rotational axis of the clutch assembly to form circumferential grooves. The grooves may have straight and/or tapered edges, and may include one or more vias or through holes running from the grooves to the opposing (friction) surface of the inner cone member (e.g., to supply oil and cooling to the friction surface).

In some examples, cone clutch assemblies in accordance with the present disclosure may be configured with grooves on the back side/inner surface of the inner cone member (e.g., starting at a position at or near the smallest diameter of the inner cone member and extending circumferentially to the largest diameter of the inner cone member) to provide increased cooling effectiveness without sacrificing the radial stiffness needed to control the cone angle. In some examples, more wetted area for cooling may be needed in the inner diameter of the male cone to increase cooling effectiveness. As described herein, this may be accomplished by adding one or more grooves in the back side/inner surface of the inner cone member and jetting the grooves (and inner surface more generally) with a cooling fluid such as oil. In some examples, the groove(s) may extend circumferentially about the rotational axis of the clutch assembly in a spiraled manner. The circumferential groove(s) may be preferable compared to straight grooves, which may not improve cooling effectiveness since the oil (or other cooling fluid) may primarily flood the grooves but not effectively flow over the groove surfaces thereby limiting the cooling flow on the groove walls and restricting the amount of heat transfer within the wetted surface area.

In some examples, a drainage path for the cooling fluid out of the grooves may be helpful to improve cooling effectiveness without sacrificing hoop stiffness. This may be accomplished by providing one or more grooves that gradually thread/spiral axially to an exit point on the back edge of the inner cone member. This configuration may allow the heat transferred to the cooling fluid to be routed through the individual grooves centrifugally without flooding the individual grooves and stagnating the cooling fluid. Providing multiple independent grooves may further improve heat transfer by decreasing the amount of heated area covered by each groove and improving the temperature change across each groove. The more surface area on the back side surface of the inner cone defined by the fins formed by the grooves, the more effective the cooling.

In some examples, the radially stiffness of the inner cone member may be maintained by including stiffening ribs, e.g., primarily in the circumferential direction, where the ribs are defined by the side walls of the grooves. With the gradual axial indexing of the thread, the hoop stiffness may be maintained. The side walls of the grooves may also be tapered or straight (e.g., substantially orthogonal to the inner surface plane) to optimize the impingement on the groove walls and improve the heat transfer. Fluid transfer through holes can also be added, e.g., to the groove ID and routed to the friction surface to supply oil and cooling to the friction surfaces.

Figure 1:
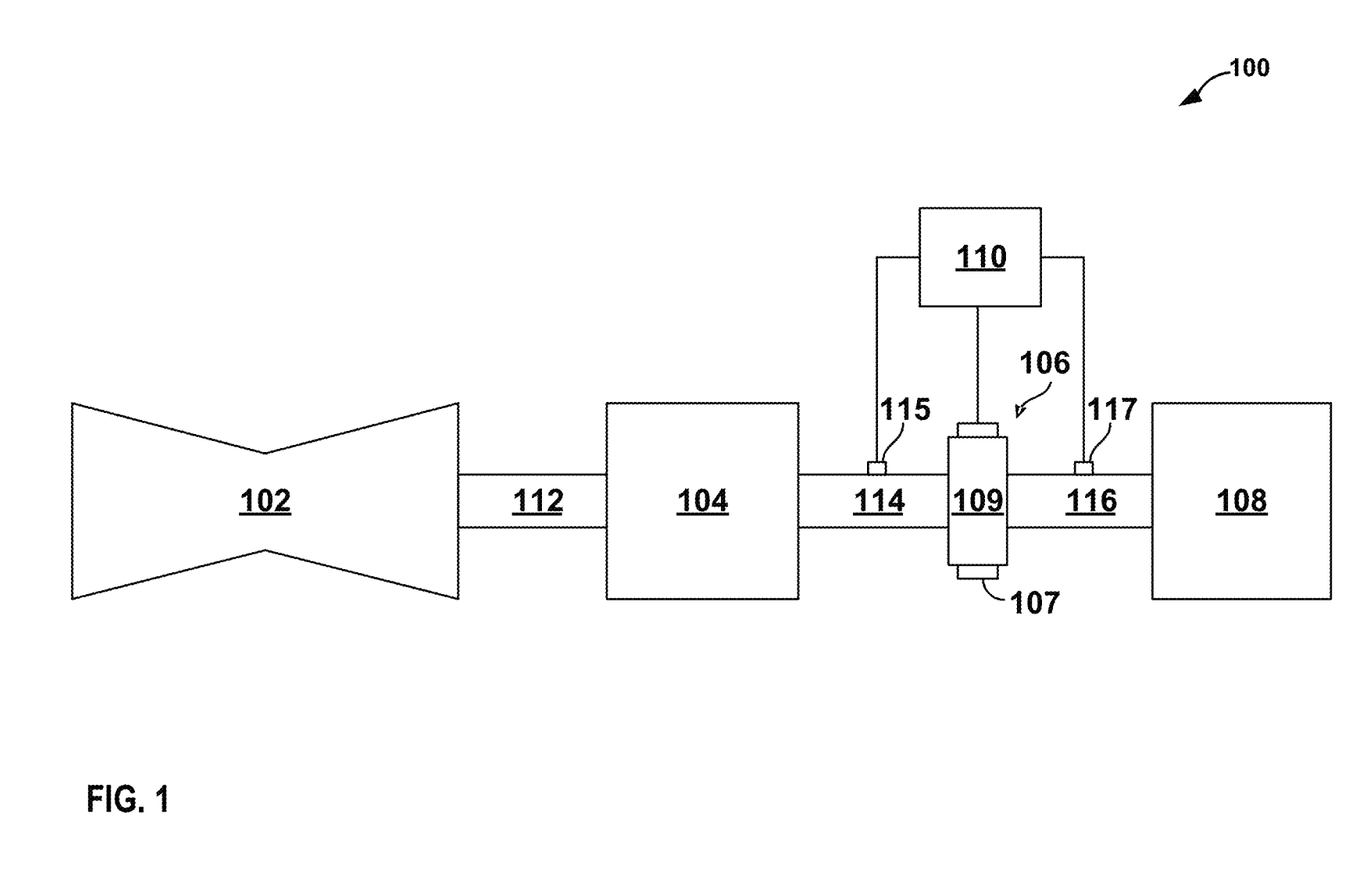
FIG. 1 is a conceptual diagram illustrating an example system including an example cone clutch assembly.

FIG. 1 is a conceptual diagram illustrating an example system 100 including cone clutch assembly 106. System 100 may include, for example, an engine 102, an accessory gear box 104, cone clutch assembly 106, an accessory component 108 (accessory 108), and a controller 110. As will be described further below, clutch assembly 106 includes two cone clutch members 109 (individually shown as outer cone member 122 and inner cone member 124 in FIG. 2 for example). System 100 may include any suitable mechanical system. In some examples, system 100 may include at least a portion of a mechanical system of a vehicle powered by an internal combustion engine. In some examples, system 100 may include at least a portion of a mechanical system of an aircraft powered by a gas turbine engine. In some examples, system 100 may form a part of a system that includes an aircraft engine (e.g., turbine engine) that drives a reduction gearbox which drives the clutch and helicopter rotor(s). The clutch may drive a reduction gearbox which drives a propeller to increase forward velocity of the helicopter. In some examples, cone clutch assembly 106 may be employed as a clutch assembly in a propulsion system for a helicopter or other rotary wing aircraft such as the examples propulsion systems described in U.S. Patent Publication No. 2022/0018415 by Sauer (U.S. patent application Ser. No. 17/335,259 filed Jun. 1, 2021), the entire content of which is incorporated herein by reference.

Engine 102 is mechanically coupled to accessory gear box 104 via drive shaft 112. Engine 102 is configured to rotate (e.g., drive) drive shaft 112. Although illustrated as a gas turbine engine, in other example, engine 102 may include other devices configured to output shaft work, such as internal combustion engines, fuel cells, electric motors or generators, pneumatic motors, or hydraulic motors.

Drive shaft 112 may include any suitable shaft and/or gear system to transfer shaft work from engine 102 to accessory gear box 104. In examples in which engine 102 includes a gas turbine engine, drive shaft 112 may include an internal gearbox including a direct drive, a stub shaft drive, an idler shaft drive, or other mechanical coupling configured to drive a radial drive shaft or tower shaft. In some examples, drive shaft 112 may include an intermediate gearbox.

Accessory gearbox 104 is configured to transfer shaft work from drive shaft 112 to input shaft 114. In some examples, accessory gearbox 104 may include an accessory drive of a gas turbine engine system. Input shaft 114 is configured to drive one or more accessories of system 100. Although illustrated as a single input shaft 114, system 100 may include two or more input shafts driven by drive shaft 112 via accessory gearbox 104. For example, accessory gearbox 104 may include a plurality of spur gears mechanically coupling drive shaft 112 to respective input shaft of a plurality of input shafts 114, each at a selected gear ratio.

Input shaft 114 may be selectively coupled to an output shaft 116 via cone clutch assembly 106 so that output shaft 116 is rotationally driven by input shaft 114 when cone clutch assembly 106 is engaged and, conversely, when cone clutch assembly 106 is disengaged, output shaft 116 is not driven by input shaft 114. Input shaft 114 may be coupled (e.g., rotationally fixed) to outer cone member 122 (shown in FIG. 2) of clutch assembly 106, and inner cone member 124 (shown in FIG. 2) of clutch assembly 106 may be coupled (e.g., rotationally fixed) to output shaft 116. As used herein, the outer cone member 122 may also be referred to as a female cone member, and the inner cone member 124 may also be referred to as a male cone member. Although system 100 is described herein primarily with outer cone member 122 being fixed to input shaft 114 and with inner cone member 124 being fixed to output shaft 116, in other examples, outer cone member 122 may be fixed to output shaft 116 and inner cone member 124 may be fixed to input shaft 114. Output shaft 116 is mechanically coupled to accessory 108. Accessory 108 may include, for example, one or more of fuel pumps, generators, constant speed drives, oil pumps, hydraulic pumps, compressors, engine starters, tachometer sensor drives, and auxiliary gearbox drives.

In some examples, system 100 may include at least one of rotational sensors 115 and 117. Rotational sensors 115 and 117 are configured to sense a rotational speed of input shaft 114 (or an outer cone member coupled to input shaft 114) and output shaft 116 (or an inner clutch plate coupled to output shaft 116), respectively. For example, rotational sensors 115 and/or 117 may include one or more of a reflective sensor, an interrupter sensor, an optical encoder, a variable-reluctance sensor, an eddy-current killed oscillator sensor, a Wiegand sensor, or a Hall-effect sensor. In some examples, rotational sensors 115 and/or 117 may be configured to determine a rotation of input shaft 114 or output shaft 116, respectively, based on sensing a target disposed on input shaft 114 (of the first clutch plate) or output shaft 116 (or the second clutch plate). In some examples, controller 110 may be configured to receive signals from at least one of rotational sensors 115 or 117 and control, based on a rotational speed determined based on the signal, an electrical current applied to electromagnet 107.

In the example shown in FIG. 1, controller 110 may selectively engaged and disengage clutch assembly 106 as described herein, e.g., to selectively drive output shaft 116 via input shaft 114. For example, as described further below, controller 110 may control the axial position of outer cone member 122 relative to inner cone member 124, e.g., via an actuator. To engage clutch assembly 106, controller 110 may move inner cone member 124 towards outer cone member 122 to frictionally engage opposing surfaces of members 122, 124. Conversely, to disengage clutch assembly, controller 110 may move inner cone member 124 away from outer cone member 122 to frictionally disengage opposing surfaces of members 122, 124.

Controller 110 may include, for example, a computing device, a desktop computer, a laptop computer, a workstation, a server, a mainframe, a cloud computing system, a tablet, a smart phone, or the like. Controller 110 is configured to control operation of system 100, including, for example, the position of outer cone member 122 relative to inner cone member 124. Controller 110 may be communicatively coupled to the various component of system 100 including, e.g., the actuator or other component configured to axially move inner cone member 124 relative outer cone member 122, sensors 115 and/or 117, and/or the like using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like. In some examples, controller 110 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Figure 2:
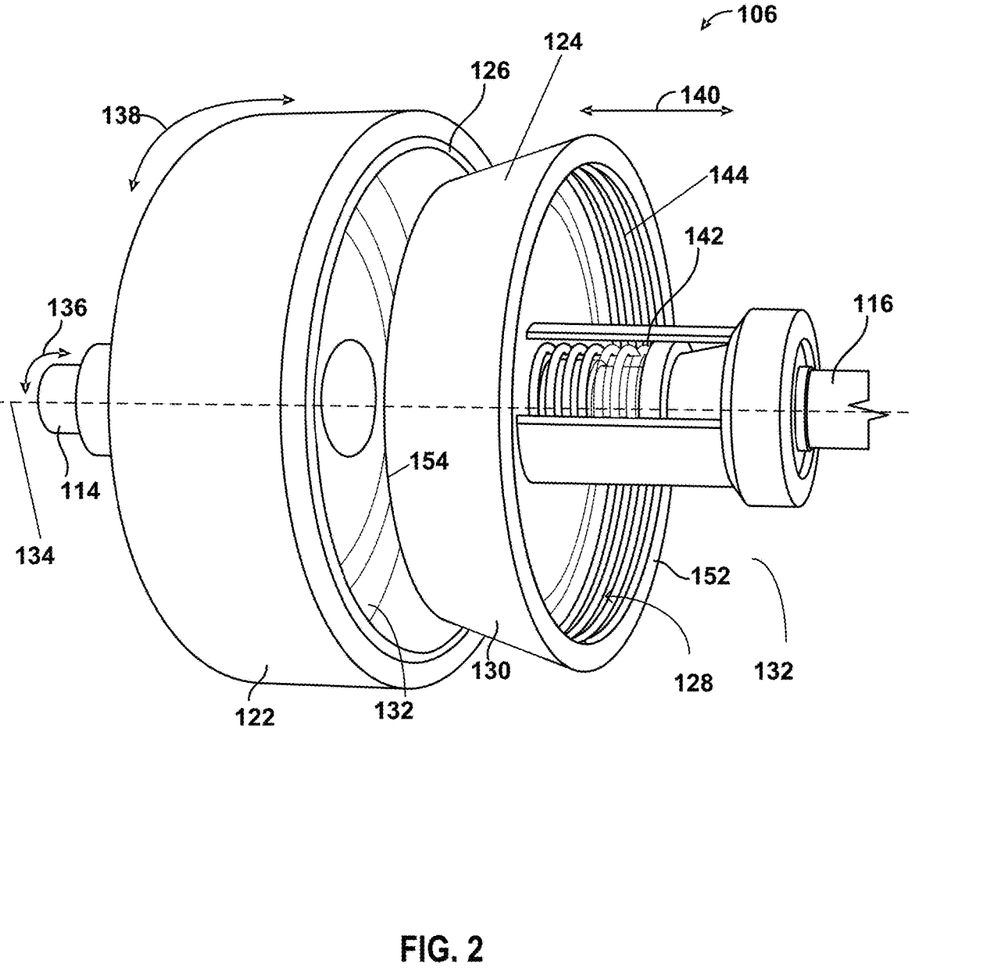
FIG. 2 is a conceptual diagram illustrating an example cone clutch assembly.
Figure 3A:
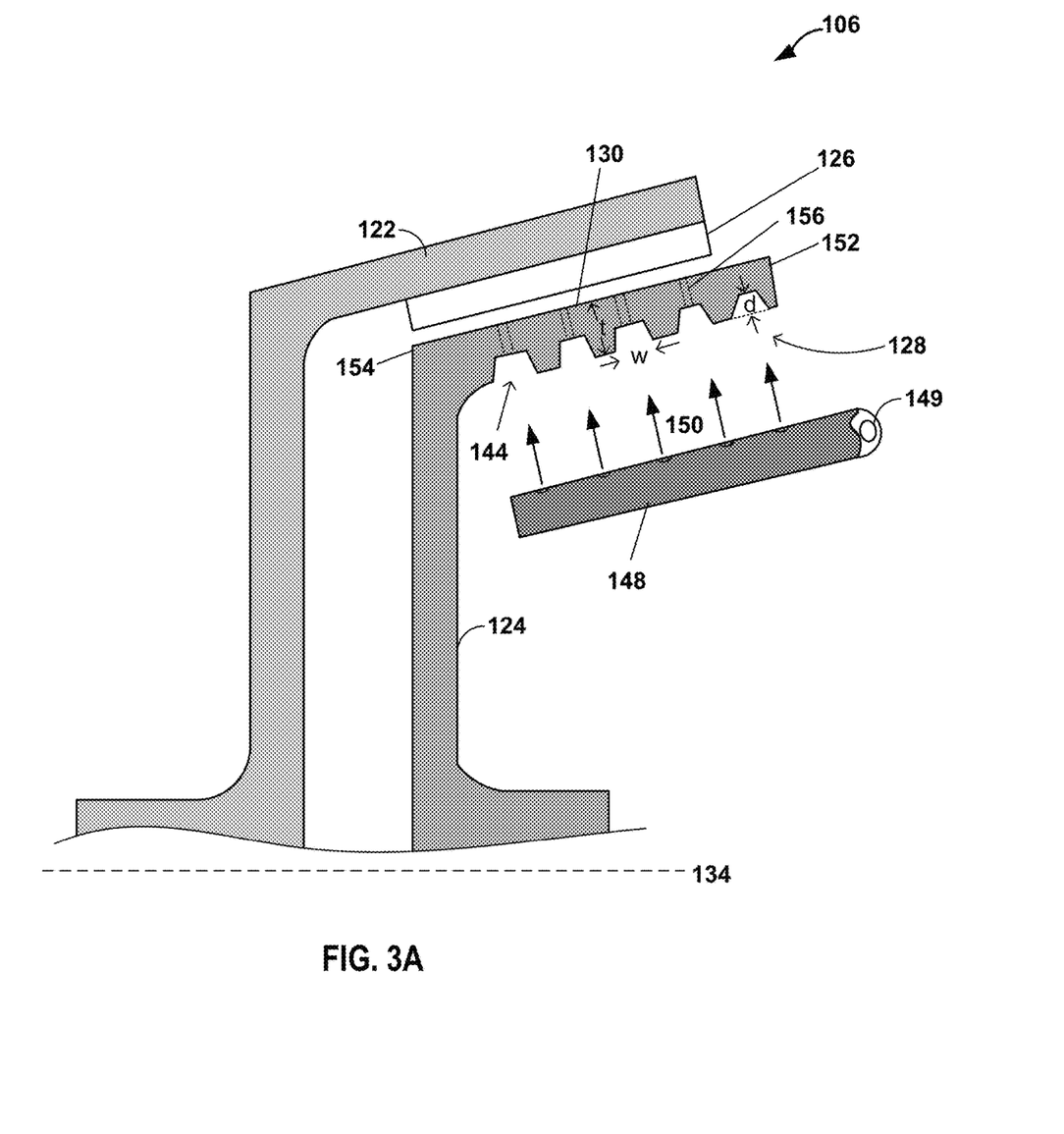
FIGS. 3A and 3B are simplified conceptual diagrams illustrating cross-sections of a portion of an example cone clutch assembly.
Figure 3B:
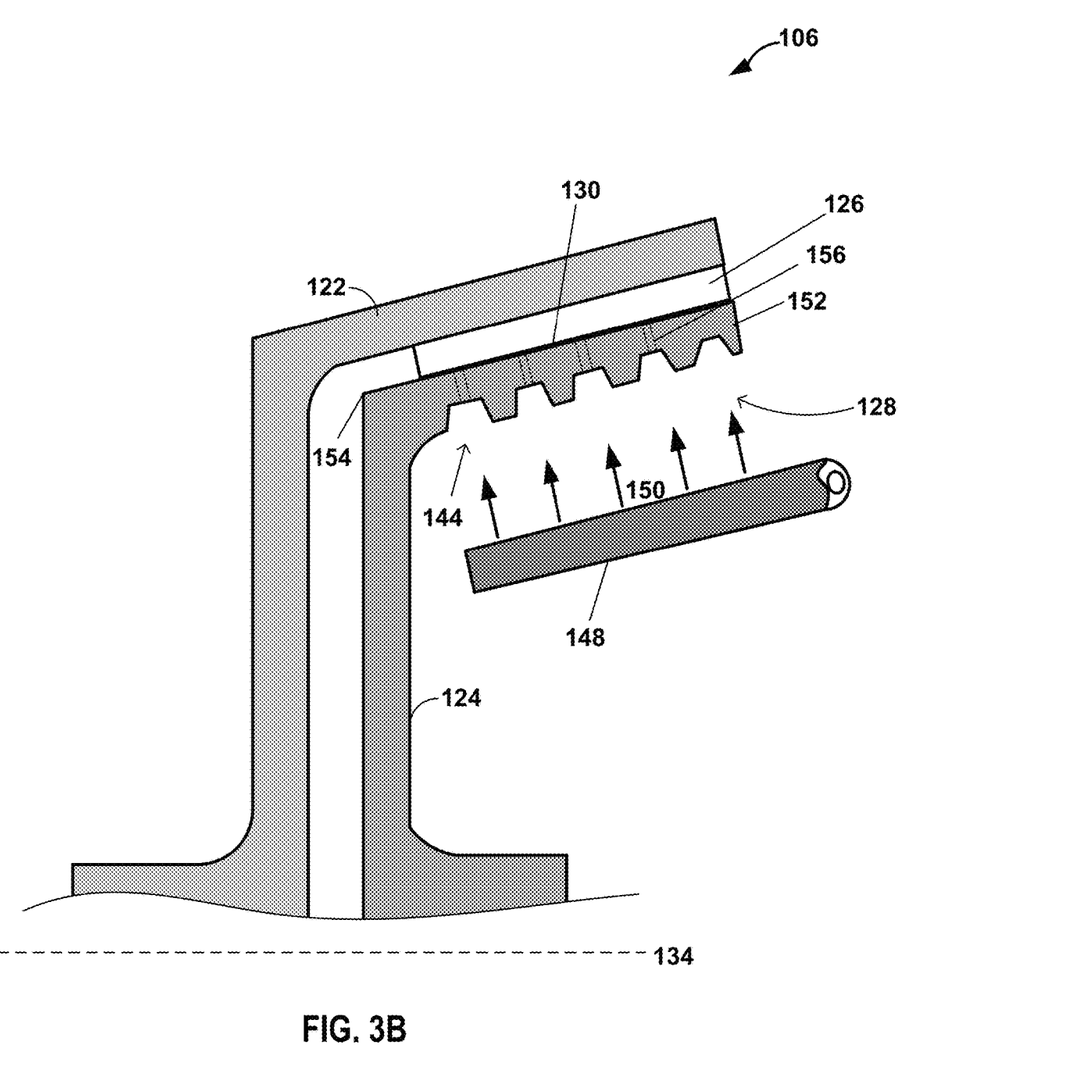
Figure 4:
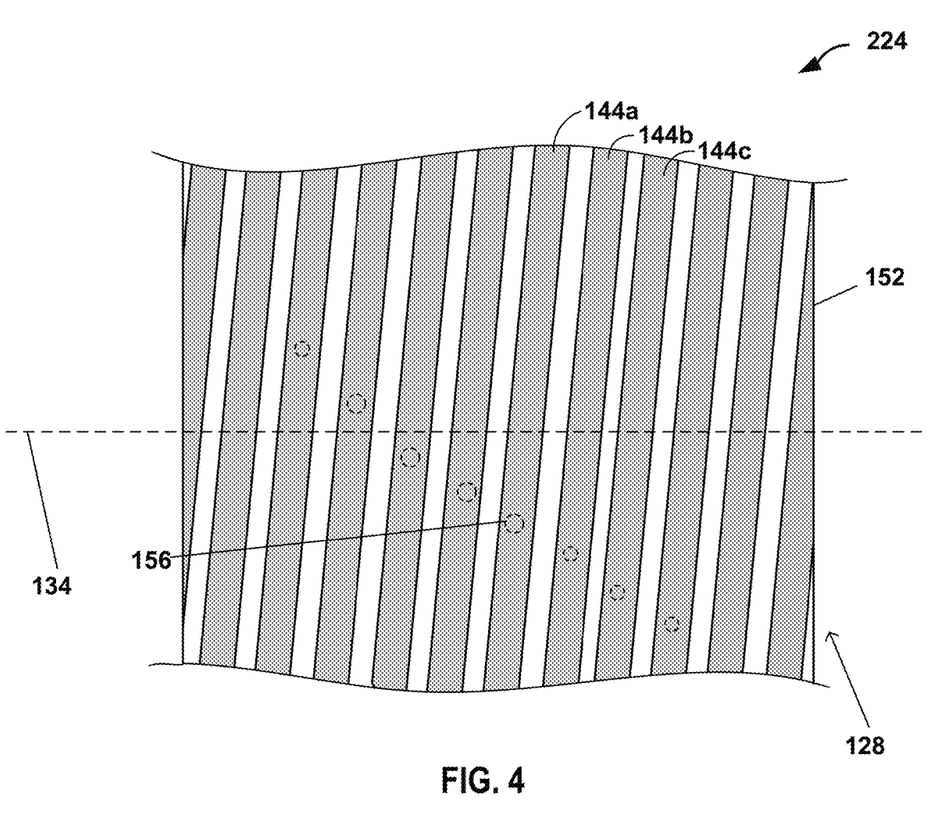
FIG. 4 is a conceptual diagram illustrating an example groove pattern for use on an inner surface of an inner cone member in accordance with some examples of the disclosure.

FIG. 2 is a conceptual diagram illustrating an example cone clutch assembly 106 that may be used in system 100. FIGS. 3A and 3B are conceptual diagrams showing a simplified cross-section of a portion of cone clutch assembly 106 in engage and disengaged, respectively configurations. While the example of FIGS. 2-4 show a system in which the outer cone member 122 is attached to the input shaft/drive and the inner cone member 124 is attached to the output shaft/drive, it is contemplated that system 100 may be configured with outer cone member 122 attached to the output shaft/drive and the inner cone member 124 may be attached to the input shaft/drive, e.g., depending on the configuration of the driveline including which of the cone members may be more easily moved axially, and the like.

Cone clutch assembly 106 includes outer cone member 122 attached or otherwise fixed (e.g., rotationally fixed) to input shaft 114, and inner cone member 124 attached or otherwise fixed (e.g., rotationally fixed) to output shaft 116. Input shaft 114 rotates about axis 134 in direction(s) 136. Likewise, output shaft 116 rotates about axis 134 when driven by input shaft 114, e.g., when clutch assembly 106 is in an engaged configuration.

Inner cone member 124 includes outer (or front/friction) surface 130 and inner surface 128 (also referred to herein as the "back surface" or "back side surface") that opposes outer surface 130. Outer cone member 122 include inner surface 132. In the example of FIG. 2, assembly also includes friction member 126 that is located on inner surface 132 of outer cone member 132. In other examples, friction member 126 may additionally, or alternatively, be located on outer surface 130 of inner cone member 124. Friction member 126 may be formed of a friction material that is different material than outer cone member 122 and/or inner cone member 124.

In some examples, outer cone member 122 and/or inner cone member 124 may be formed of metal and/or metal alloys such as steel, aluminum and aluminum alloy, titanium and titanium alloy, and the like. In some examples, friction member 126 may be formed of KEVLAR® (e.g., in a polymer binder), carbon fiber weave, carbon fibers in a polymer binder, carbon-carbon, sintered bronze, or other composite material. In some examples, the friction material of friction member 126 may be selected to provide an optimum or otherwise advantageous compromise of friction properties, wear, thermal resilience, heat conductivity, and the like. The material of friction member 126 may defining a wear resistant coating that has good stability, can be bonded to the inner and/or outer cone, has good lubricity, compatible to oils used and/or exhibits good temperature capability.

As shown in FIGS. 3A and 3B, with the generally conical shape, the friction surfaces of inner cone member 124 and outer cone member 122 are orientated at an angle relative to rotational axis 134 (which extends substantially parallel to the x-axis shown in FIGS. 3A and 3B) that is greater than zero and less than 90 degrees. The angle of the opposing friction surfaces of inner cone member 124 and outer cone member 122 may be generally the same so as to allow for relatively evenly distributed contact between the friction surface with the inner cone member 124 and outer cone member 122 are engaged with each other, e.g., as shown in FIG. 3B.

Inner cone member 124 is moveable relative to outer cone member 122 along translation direction 140 that is substantially parallel to rotational axis 134. For ease of illustration, clutch assembly 106 is shown in FIG. 2 in a disengaged configuration, e.g., where the friction surface defined by outer surface 130 of inner cone member 124 is not in contact with friction member 126. To transition to an engaged configuration such as that shown in FIG. 3B, inner cone member 124 may be moved, e.g., under the control of controller 110, towards outer cone member 122 so that outer surface 130 engages friction member 126 on inner surface 132 of outer cone member 122. For example, in the example assembly of FIG. 2, spring 142 may be employed to apply an axial force to inner cone member 124 that moves inner cone member 124 towards outer cone member 122 so that outer surface 130 engages friction member 126 on inner surface 132 of outer cone member 122. Spring 142 is only one example of an actuation mechanism that may be employed by clutch assembly 106 to provide proper axial movement and axial load control, e.g., to allow for selective engagement and disengagement of clutch assembly 106.

Additionally, or alternatively, a hydraulic piston or other suitable actuator may be employed to actuate the clutch assembly as described herein, e.g., from an engaged to disengaged configurations. For example, hydraulic pressure acting on a piston may be used to actuate the clutch. The hydraulic piston pressure may be controlled by a hydraulic control unit to control the pressure. The piston may have a rod side and a head side (e.g., with pressure acting on both sides of the piston) to both actuate and retract the piston. In some examples, a Hydraulic Control Unit (HCU) or other suitable control is employed to control pressure of hydraulic fluid that is ported to both sides of a piston cavity to allow engagement and disengagement. Pressure may be required for disengagement to assure the opposing cones are not rubbing together when disengaged.

The applied force may allow for frictional engagement between the two opposing friction surfaces (outer surface of friction member 126 and outer surface 130 of inner cone member 124). The frictional engagement may allow for transfer of rotation between outer cone member 122 and inner cone member 124, e.g., so that input shaft 114 drives the rotation of output shaft 116. When engaged, the rotational speed of output shaft 116 may be approximately the same as input shaft 114 about axis 116. To disengage clutch assembly 106, the force applied by spring 142 (or other actuation mechanism) may be removed, e.g., under the control of controller 110, to allow for a gap between the two opposing friction surfaces (outer surface of friction member 126 and outer surface 130 of inner cone member 124). When disengaged, outer cone member 122 may rotate freely without rotating inner cone member 124.

As shown in FIGS. 3A and 3B, clutch assembly 106 also includes fluid delivery device 148. Fluid delivery device 148 may be any device suitable for delivering cooling fluid 150 such as a cooling oil to inner surface 128. For example, as partially shown in FIGS. 3A and 3B, fluid delivery device 148 may be an oil jetting device 148 supplied with oil via oil supply line 149. As shown, fluid delivery device 148 directs cooling fluid 150 to inner surface 128 of inner cone member 124, e.g., under the control of controller 110. Fluid 150 may be any suitable cooling fluid. Example cooling fluids may include a cooling oil with a relatively high heat capacity.

Fluid 150 may be liquid fluid. In some examples, cooling fluid 150 may be a cooling oil that also functions as a lubricating oil for the friction surfaces of the inner and outer cone members. In some examples, fluid 150 may be a diester oil typically used within gas turbine engine applications, e.g., to avoid the use of multiple oil systems which would add weight to the overall system. The oil flow may be controlled by an orifice and then routed to the area requiring the cooling by some controlled delivery path. The thermal capability/stability of a particular fluid may be important factors when selecting fluid 150.

In accordance with some examples of the disclosure, inner cone member 124 includes at least one groove 144 formed into inner surface 128. Groove(s) 144 may be configured facilitate the removal of heat or otherwise cool inner cone member 124, e.g., during operation of cone clutch assembly 106. For example, assembly 106 may be configured such that a cooling fluid (e.g., a cooling oil) is delivered to groove(s) 144, e.g., by a fluid delivery member 148 such as that shown in FIG. 3A, during operation of clutch assembly 106 in the engaged and/or disengaged configuration. The fluid delivered to inner surface 128 may be received or gathered into groove(s) 144, and then transferred over the surface of groove(s) 144 so that heat may be conducted into the fluid from inner cone member 124. The cooling fluid may travel through groove(s) and exit at back edge 152 of inner cone member 124. The removal of the heat by the fluid may provide for backside cooling cone member 124 including the cooling of outer/friction surface 130.

As will be described further, in some examples, rather than groove(s) 144 extending linearly from a portion of inner surface 128 nearest front edge 154 (inner diameter) to back edge 152 of inner surface 128 in a direction substantially parallel to axis 134, groove(s) 144 may extend circumferentially around rotational axis 134 of cone member 124/output shaft 116. Rather than forming discrete circular grooves, groove(s) 144 may be threaded in the axial direction so that groove(s) 144 extend axially in a spiral or helical manner. Such a feature is illustrated more clearly in, e.g., in the examples of FIGS. 4-6.

As described herein, the circumferential orientation of groove(s) 144 may allow for improved transfer of the fluid through groove(s) 144, e.g., towards and/or out of back edge 152, based on the centrifugal forces associated with the rotation of inner cone member 124. The direction of the threading for groove(s) 144 may be such that the flow direction of fluid 150 within groove(s) 144 is in the same direction as windage, e.g., to help drive the flow through the groove more efficiently. However, if the centrifugal forces due to the rotation of inner cone member 124 is high enough, fluid 150 may flow within groove(s) 15 regardless of the direction of the threading.

Moreover, the circumferential orientation of grooves 144 may function to provide improved hoop stiffness for the cone. For example, if grooves 144 were axially oriented instead, cone member 124 would lose hoop stiffness and, in some cases, cone member 124 would not be stiff enough and/or would deflect too much under centrifugal loading. By orienting circumferentially, the hoop stiffness of cone member 124 is maintained at a level to prevent such issues.

Additionally, grooves 144 may function or otherwise form cooling fins, e.g., that provide cooling of cone member 124 during operation of assembly 106. Grooves 144 may provide a relatively high amount of surface area to transfer heat as needed during operation. Locating grooves 144 circumferentially may also provide more groove length (e.g., as compared to axially orientated grooves) and therefore more surface area to absorb and transfer more heat.

Fluid 150 that exits out of groove(s) 144 and/or hole(s) 156 may be captured (and optionally cooled by a heat exchanger), filtered, and then recycled back into the system (e.g., in the case of a cooling liquid). In the case of a gas fluid, the gas may be recaptured, cooled (e.g., in a heat exchanger), and recycled in some examples. In the case of air fluid, the air may be released from the system and new air may be used for the supply. In some examples, fluid 150 is scavenged out of the clutch via a scavenge pump and directed to an air/oil or fuel/oil cooler typically to remove heat from the fluid.

Groove(s) 144 may be a single groove or multiple grooves in inner surface 128. For example, a single groove 144 may be a continuous groove that spirals circumferentially about axis 134 starting at a location near front edge 154 and terminating at a single point at back edge 152. In other examples, a plurality of grooves 154 may be formed into inner surface 128 that extend from locations near front edge 154 and terminating at respective locations at back edge 152. In some examples, grooves 144 may be similar to threading on a nut with threading configured to receive a threaded bolt. Groove(s) 144 may increase the surface area of inner surface 128 available for conduction of heat into fluid 150, e.g., as compared to inner surface 128 being substantially planar.

Groove(s) 144 may extend into inner surface 128 to any suitable depth (d) and width (w). In some examples, the depth d and or width w of the groove(s) 144 may be substantially constant along the length of groove(s) 144 or may vary. Groove(s) 144 may extend into inner surface 128 at approximately a 90 degree angle or substantially orthogonal to the surface plane. In other examples, groove(s) 144 may extend into inner surface 128 in another manner such as with an angled taper (e.g., less than 90 degrees as shown for the walls of grooves 144 in FIGS. 3A and 3B), a taper in a step-wise manner, or an undercut configuration (e.g., greater than 90 degrees). The bottom of groove(s) 144 may be a planar surface, e.g., in square type grooves, or may be angled, e.g., in the case of a triangular type grooves. In some examples, an optimizer tool may be employed to optimize the geometry of groove(s) 144, e.g., to provide a fin shape that best removes the heat and provide the lowest temperature. This approach may try to provide as great of surface area as possible, as close to the heat source as possible. Tapering the side walls of the fins may likely be more efficient than straight side walls since this provides more surface area.

As shown in FIGS. 3A and 3B, in some examples, inner cone member 124 includes one or more through holes 156 that extend from inner surface 128 to outer surface 130 of inner cone member 124. Holes 156 may be located within groove(s) 144, and may allow a portion of fluid 150 to flow from groove(s) 144 to outer surface 130 of inner cone member 124 to the liner surface (friction member surface), and vice versa. As described herein, front side 130 defines the friction surface of inner cone member 124 when cone clutch assembly 106 is in an engaged configuration such as that shown in FIG. 3B. In some examples, holes 156 may transfer fluid such as fluid 150 from the groove(s) 144 to the friction surface to provide lubricity, e.g., where the fluid on the friction surfaces functions to help control the coefficient of friction. n some examples, holes 156 are not present, e.g., in designs where oil or other fluid flow comes up between the respective cones to provide some lubrication to the low diameter of the liner interface. The flow introduced between the liner could serve all the lubrication needs of the friction interface and eliminate the need for the holes 156.

FIG. 4 is a conceptual diagram illustrating a portion of inner surface 128 of an example inner cone member 224. Inner cone member 224 may be similar to cone member 124 and likes features are similarly numbered. As shown, cone member 224 include multiple grooves such as 144*a*-144*c* that extend from front edge 154 to back edge 152 in an angled manner, e.g., rather than extending straight from front edge 154 to back edge 152 substantially parallel to rotational axis 134. Each groove includes an optional through hole such as through hole 156 labeled in groove 144*a*. While a single through hole is shown in each respective groove, in other examples, individual grooves may include multiple through holes, or some or all individual grooves may not include a through hole. Additionally, in some examples, the through holes may be located nearer front edge 154 rather than distributed substantially evenly between front edge 154 and back edge 152, or nearer back edge 152 compared to front edge 154.

Figure 5:
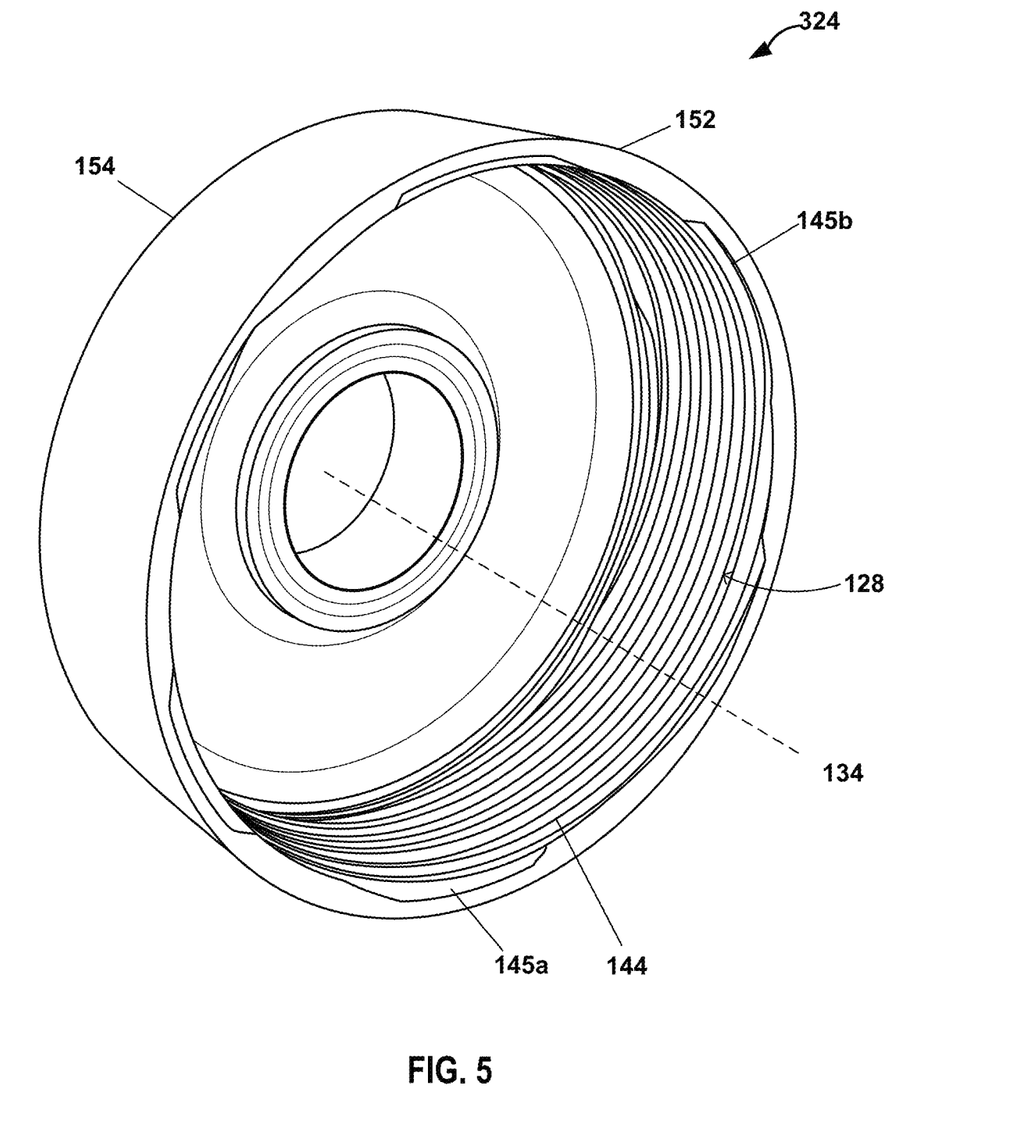
FIG. 5 is a conceptual diagram illustrating a perspective view of an example inner cone member for a cone clutch assembly in accordance with some examples of the disclosure.

FIG. 5 is a conceptual diagram illustrating an example inner cone member 324 from a perspective view. Inner cone member 324 may be substantially similar to that of inner cone member 124 and similar features are similarly numbered. The view of FIG. 5 illustrates a grooves 144 formed in inner surface 128 of inner cone member 324 with a total of six individual grooves 144. Each individual groove 144 extends out of back edge 152 of inner cone, e.g., at locations 144*a* and 144*b* of two of the individual grooves. As described herein, fluid 150 may exits out of the respective grooves 144 in inner surface 128 at location 144*a*, 144*b*.

Figure 6:
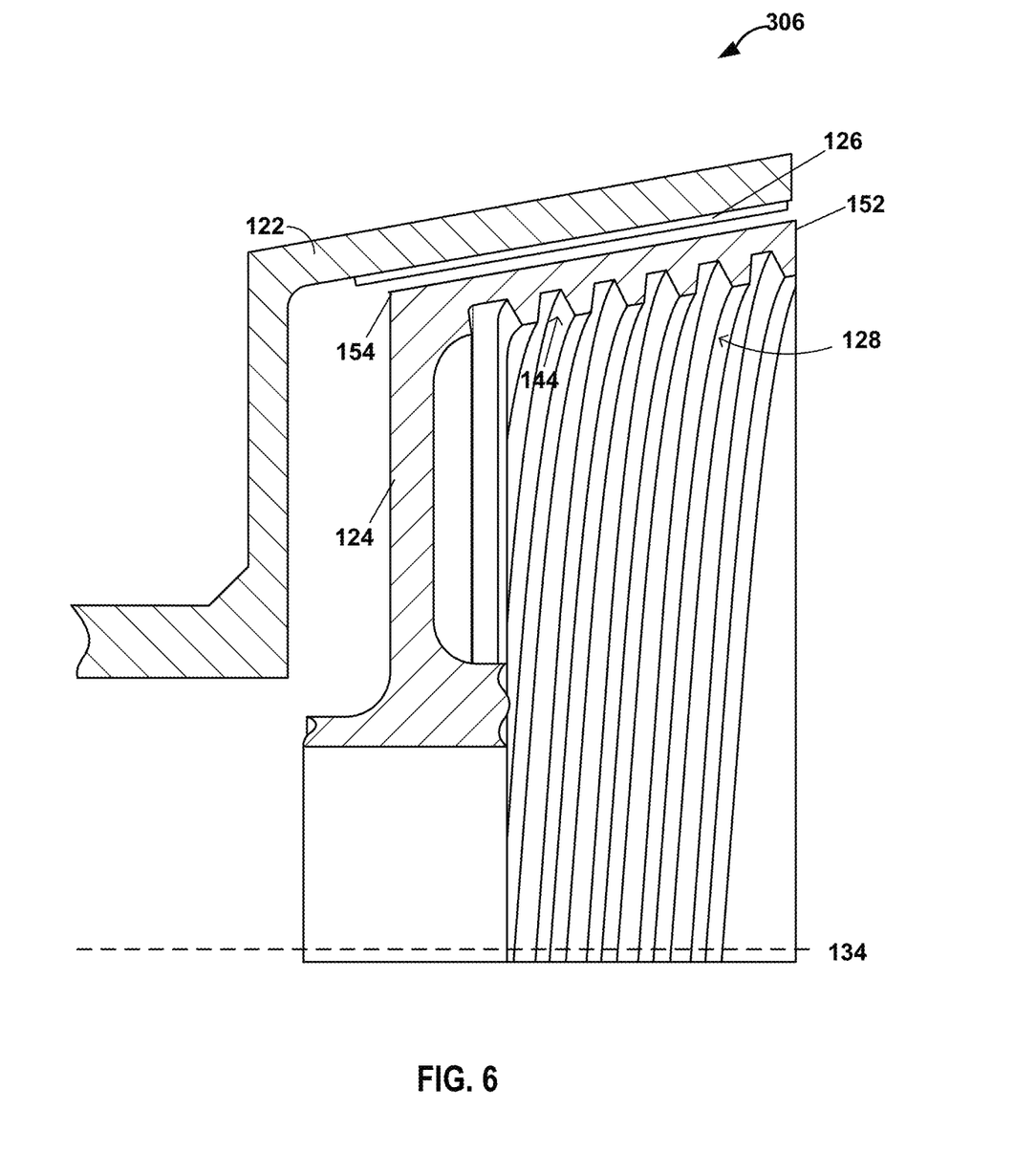
FIG. 6 is a conceptual diagram illustrating a cross-section of a portion of an example cone clutch assembly.

FIG. 6 is a conceptual diagram illustrating a partial cross-sectional view of clutch assembly 306. Clutch assembly 306 may be substantially similar to clutch assembly 106, e.g., as shown in FIGS. 3A and 3B. In the example of FIG. 6, inner cone member 124 is shown in a disengaged configuration from outer cone member 122 including friction member 126. Back side 128 of inner cone member 124 includes one or more grooves 144 formed into the surface and circumferentially extending around rotational axis 134 is a spiraled manner. Although not shown in FIG. 6, clutch assembly 306 may include a fluid delivery member such as fluid delivery member 148 that delivers fluid 150, e.g., under the control of controller 110, to back side 128 so that the fluid 150 gathers in grooves 144 to remove heat from inner cone member 124.

Figure 7:
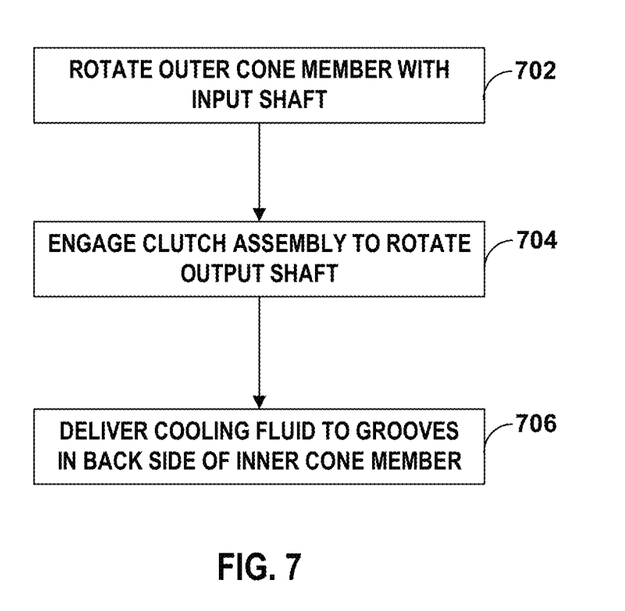
FIG. 7 is a flow diagram illustrating an example technique for operating a system including a cone clutch assembly in accordance with some examples of the disclosure.

FIG. 7 is a flow diagram illustrating an example technique for controlling engagement of an engine with an accessory using a cone clutch assembly. Using the technique of FIG. 7, controller 110 may control system 100 to selectively transfer rotational motion from accessory gear box 104 to accessory component 108 via clutch assembly 106. For ease of description, the example of FIG. 7 will be described with regard to system 100 and cone clutch assembly 106 described above with regard to FIGS. 2, 3A, and 3B. However, the technique may be used to control other systems and clutch assemblies. Additionally, system 100 and cone clutch assembly 106 may be controlled using other techniques.

The technique illustrated in FIG. 7 may include rotating outer cone member 122 around rotational axis 134 by the rotation of input shaft 112 (702). As discussed above, engine 102 may be configured to rotate input shaft 112, e.g., via drive shaft 112, accessory gear box 104, and input shaft 114. Inner cone member 124 may be disengaged from outer cone member 122 during the rotation of outer cone member 122, e.g., with spring 142 not applying an axial force that forces the friction face of inner cone member 124 against friction member 126 of outer cone member 122. As described above, when disengaged, a gap may be present between the respective friction surfaces of inner cone member 124 and outer cone member 122.

Controller 110 may then selectively engage clutch assembly 106 to transfer rotational motion from input shaft 114 to output shaft 116, e.g., to drive accessory 108 (704). For example, controller 110 may actuate spring 142 to apply an axial force to inner cone member 124 that moves inner cone member 124 towards outer cone member 122 so that outer surface 130 engages friction member 126 on inner surface 132 of outer cone member 122. The applied force may allow for frictional engagement between the two opposing friction surfaces (outer surface of friction member 126 and outer surface 130 of inner cone member 124). The frictional engagement may allow for transfer of rotation between outer cone member 122 and inner cone member 124, e.g., so that input shaft 114 drives the rotation of output shaft 116.

During the engagement of inner cone member 124 and outer cone member 122, controller 110 may control fluid delivery member 148 to delivery fluid 150 to back side 128 of inner cone member 124. Fluid 150 may be deposited or otherwise be delivered from fluid delivery member 150 into groove(s) 144. In some examples, fluid 150 may be delivered so that it is evenly distributed over back side 128 while in others, a majority of fluid 150 may be concentrated nearer front edge 154 of inner cone member 124. The delivered fluid 150 may flow through groove(s) 144, e.g., based on the centrifugal force associated with the rotation of inner cone member 124. At least a portion of the delivered fluid 150 may flow along groove(s) 144 and exit out back edge 152 of inner cone member 124 to remove heat from inner cone member 124. In examples in which inner cone member 124 includes optional through holes 156, a portion of the delivered fluid 150 may be transferred to the friction/outer surface 130 of inner cone member 124.

In some examples, controller 110 may delivery fluid 150 to back side 128 when inner cone member 124 is engaged with outer cone member 122, e.g., with the delivery being ceased with inner cone member disengages from outer cone member 122. Alternatively, or additionally, system 106 may include a temperature sensor so that controller 110 may deliver fluid 150 to cool inner cone member 124 whenever inner cone member reaches a temperature above a predetermined threshold. In still other examples, system 106 may be configured to deliver flow of fluid 150 substantially continuously. During engagement, heat may build up relatively quickly because of the short duration of the engagement and system 106 needs to continue to cool for a short amount of time after the engagement. In some examples, the flow rate after this time period may be reduced to reduce oil flow.

Controller 110 may control the delivery of fluid 150 in a manner that provides for a desired amount of heat removal from inner cone member 124, e.g., to reduce the temperature, maintain the temperature, or reduce the rate of temperature increase of inner cone member 124. In some examples, controller 110 may increase or decrease the amount of fluid 150 delivered to back side 128 to increase or decrease, respectively, the amount or rate of heat remover from inner cone member 124, as desired. The amount of fluid 150 delivered may be adjusted by adjusting the flow rate of fluid 150 out of fluid delivery device 148. In some examples, fluid delivery member 150 may delivery fluid 150 on a substantially continuous basis or periodically under the control of controller 110. Although not shown in FIG. 7, controller 110 may selectively disengage cone clutch assembly 106 to stop driving the rotation of output shaft 116. When cone clutch assembly 106 is disengaged, fluid delivery member 148 may cease the delivery of fluid 150 to back side 128 of inner cone member 124 or may continue to deliver fluid 150, if desired.

Various examples have been described. These and other examples are within the scope of the following clauses and claims.

What is claimed is:

1. A cone clutch assembly comprising:
an inner cone member configured to be rotationally coupled to a first shaft, the inner cone member defining a first friction surface;
an outer cone member configured to be rotationally coupled to a second shaft, the outer cone member defining a second friction surface opposing the first friction surface; and
wherein the inner cone member and outer cone member are configured to be selectively engage and disengaged from each other,
wherein, when the inner cone member is engaged with the outer cone member, the first friction surface of the inner cone member frictionally engages the second friction surface of the outer cone member such that rotational motion is transferred between the inner cone member and the outer cone member, and
wherein an inner surface of the inner cone member opposing the first friction surface includes at least one groove configured to receive a cooling fluid during operation of the cone clutch assembly, and wherein the cone clutch assembly is configured such that the inner surface of the inner cone member does not contact an opposing surface adjacent the at least one groove when the inner cone member is engaged with the outer cone member to transfer rotational motion between the inner cone member and the outer cone member.

2. The clutch assembly of claim 1, wherein the at least one groove includes a groove that extends circumferentially about the inner surface of the inner cone member about a rotational axis of the inner cone member, and wherein the groove is helically wound about the rotational axis of the inner cone member.

3. The clutch assembly of claim 1, further comprising a fluid delivery device configured to deliver the cooling fluid to the at least one groove in the inner surface, wherein the fluid is configured to flow in the at least one grooves to remove heat conducted from the inner cone member into the fluid, and wherein the fluid delivery device includes multiple delivery ports through which the cooling fluid is delivered to the at least one grooves in the inner surface.

4. The clutch assembly of claim 3, wherein the fluid is configured to flow through the at least one groove at least in part due to centrifugal forces applied with rotation of the inner cone member when engage with the outer cone member.

5. The clutch assembly of claim 3, wherein the fluid delivery device comprises an oil jetting device configured to jet the cooling fluid from the multiple delivery ports to the at least one groove in the inner surface.

6. The clutch assembly of claim 1, wherein the at least one groove includes at least one wall tapered relative a surface plane of the inner surface.

7. The clutch assembly of claim 1, further comprising at least one through hole extending through the at least one groove to the first friction surface of the inner cone member.

8. The clutch assembly of claim 1, wherein the at least one groove includes a plurality of individual grooves formed into the inner surface, wherein each groove of the plurality of grooves is helically wound about a rotational axis of the inner cone member.

9. The clutch assembly of claim 1, further comprising a controller including control circuitry, wherein the controller is configured to selectively engage and disengage the inner cone member and the outer cone member from each other.

10. The clutch assembly of claim 9, wherein the controller is configured to control delivery of the cooling fluid to the at least one grooves in the inner surface of the inner cone member to remove heat from the inner cone member.

11. The clutch assembly of claim 1, wherein the at least one groove includes a circumferential groove that extends circumferentially about the inner surface of the inner cone member about a rotational axis of the inner cone member, wherein the circumferential groove provides hoop stiffening of the inner cone member and defines a circumferential fin configured to cool the inner cone member.

12. A method of operating a cone clutch assembly, the method comprising engaging an inner cone member with an outer cone member, wherein the inner cone member is rotationally coupled to a first shaft and defines a first friction surface, wherein the outer cone member is rotationally coupled to a second shaft and defines a second friction surface opposing the first friction surface,
wherein, when the inner cone member is engaged with the outer cone member, the first friction surface of the inner cone member frictionally engages the second friction surface of the outer cone member such that rotational motion is transferred between the inner cone member and the outer cone member, and
wherein an inner surface of the inner cone member opposing the first friction surface includes at least one groove configured to receive a cooling fluid during operation of the cone clutch assembly, and wherein the cone clutch assembly is configured such that the inner surface of the inner cone member does not contact an opposing surface adjacent the at least one groove when the inner cone member is engaged with the outer cone member to transfer rotational motion between the inner cone member and the outer cone member.

13. The method of claim 12, wherein the at least one groove includes a groove that extends circumferentially about the inner surface of the inner cone member about a rotational axis of the inner cone member, and wherein the groove is helically wound about the rotational axis of the inner cone member.

14. The method of claim 12, further comprising delivering the cooling fluid via a fluid delivery device to the at least one groove in the inner surface, wherein the fluid is configured to flow in the at least one grooves to remove heat conducted from the inner cone member into the fluid, and wherein the fluid delivery device includes multiple delivery ports through which the cooling fluid is delivered to the at least one grooves in the inner surface.

15. The method of claim 14, wherein the fluid is configured to flow through the at least one groove at least in part due to centrifugal forces applied with rotation of the inner cone member when engage with the outer cone member.

16. The method of claim 14, wherein the fluid delivery device comprises an oil jetting device configured to jet the cooling fluid from the multiple delivery ports to the at least one groove in the inner surface.

17. The method of claim 12, wherein the at least one groove includes at least one wall tapered relative a surface plane of the inner surface.

18. The method of claim 12, wherein the first friction surface of the inner cone member includes at least one through hole extending through the at least one groove to the first friction surface of the inner cone member.

19. The method of claim 12, wherein the at least one groove includes a plurality of individual grooves formed into the inner surface, wherein each groove of the plurality of grooves is helically wound about a rotational axis of the inner cone member.

20. A cone clutch assembly comprising:
- an inner cone member configured to be rotationally coupled to a first shaft, the inner cone member defining a first friction surface;
- an outer cone member configured to be rotationally coupled to a second shaft, the outer cone member defining a second friction surface opposing the first friction surface; and
- wherein the inner cone member and outer cone member are configured to be selectively engage and disengaged from each other,
- wherein, when the inner cone member is engaged with the outer cone member, the first friction surface of the inner cone member frictionally engages the second friction surface of the outer cone member such that rotational motion is transferred between the inner cone member and the outer cone member, and
- wherein an inner surface of the inner cone member opposing the first friction surface includes at least one groove configured to receive a cooling fluid during operation of the cone clutch assembly, wherein the cone clutch assembly is configured such that the inner surface of the inner cone member defines a non-friction surface when the inner cone member is engaged with the outer cone member to transfer rotational motion between the inner cone member and the outer cone member, and wherein the non-friction surface does not frictionally engage an opposing surface when the inner cone member is engaged with the outer cone member to transfer rotational motion between the inner cone member and the outer cone member.

* * * * *